United States Patent [19]

Maurice et al.

[11] Patent Number: 5,093,980
[45] Date of Patent: Mar. 10, 1992

[54] METHOD FOR MAKING A MULTITRACK HEAD

[75] Inventors: Francois Maurice, Verrieres le Buisson; Jean-Marc Coutellier, Maurepas; Maurice Penot, Palaiseau; Claude Bussac, Ris Orangis; Paul-Louis Meunier, Paris, all of France

[73] Assignee: Thomson-CSF, Puteaux, France

[21] Appl. No.: 538,410

[22] Filed: Jun. 15, 1990

[30] Foreign Application Priority Data

Jun. 27, 1989 [FR] France .................. 89 08544

[51] Int. Cl.⁵ .................................. G11B 5/42
[52] U.S. Cl. .................... 29/603; 360/122; 360/127

[58] Field of Search ............ 29/603; 360/119-122, 360/125-127

[56] References Cited

U.S. PATENT DOCUMENTS 4,939,836  7/1990  Mennier et al. ............... 29/603
5,007,158  4/1991  Ino et al. ...................... 29/603

Primary Examiner—Carl E. Hall
Attorney, Agent, or Firm—Oblon, Spivak, McClelland, Maier & Neustadt

[57] ABSTRACT

A method of making a multitrack head consisting in making a first network of grooves in a block of ferrite, filling the grooves with glass, planing down the surface, making a second network of grooves in a second block of ferrite, bonding these two blocks, trueing the base of the first block, depositing poles and making the winding wires go through.

16 Claims, 3 Drawing Sheets

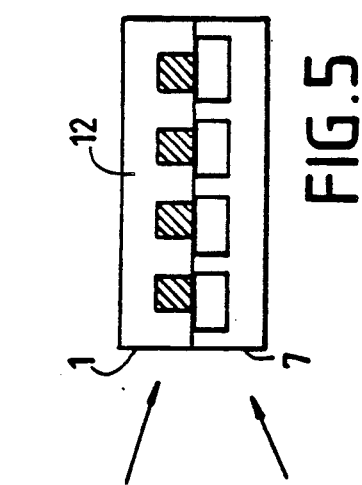
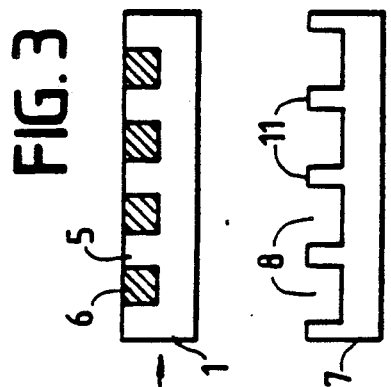
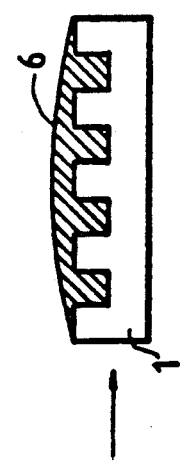
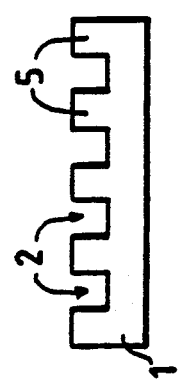
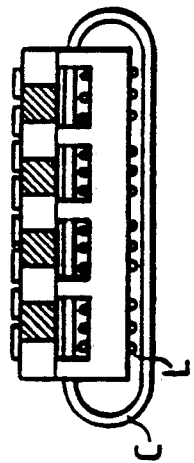
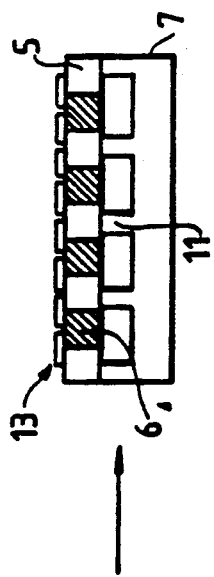
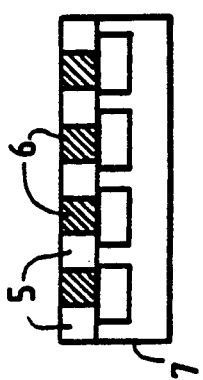

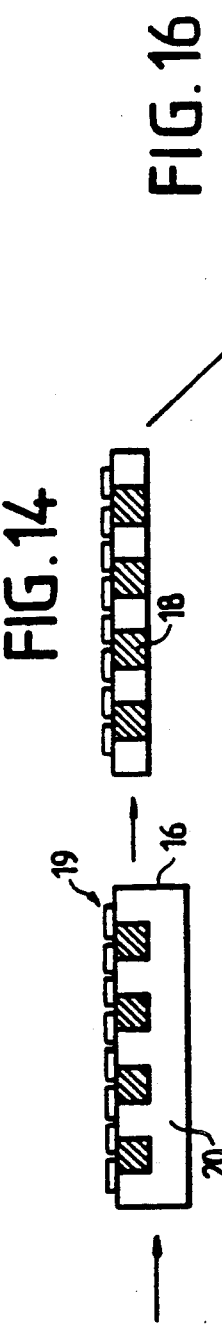
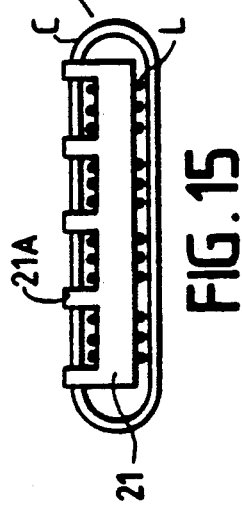
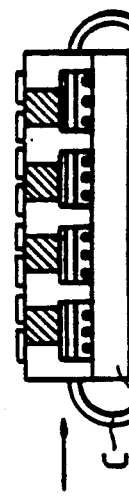
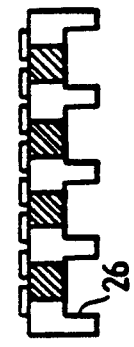
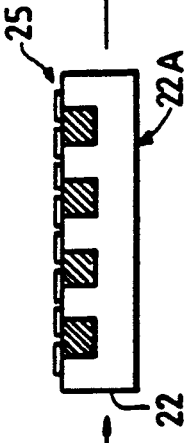
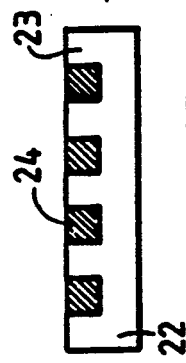

METHOD FOR MAKING A MULTITRACK HEAD

BACKGROUND OF THE INVENTION

1. Field of the Invention

The present invention pertains to a method for making a multitrack head, and to a multitrack head.

A combined technology is generally used for making multitrack heads: massive technology for the magnetic circuit and the windings, and thin-layer technology for the poles. The magnetic circuit is made of ferrite and has a base plate from which there protrude pads separated by grooves and arranged in a regular network. The poles are made of magnetic material and formed on the pads by connecting the pads diagonally over the space between the pads, with a narrow gap (generally smaller than one micron) being made in the middle of these poles. Thus, a dense network of magnetic micro-heads is obtained.

2. Description of the Prior Art

There are several known methods for the manufacturing of such magnetic heads. The ferrite magnetic substrate may be made by mechanical grooving of a substrate, the filling of the grooves with a non-magnetic material such as glass, and polishing of the upper face of the filled substrate. The network of poles can then be deposited on this polished face. This deposit can be made according to the thin-layer tehnique, with polishing steps (see for example the French patent application No. 86 14974).

The control wires for the network of magnetic heads can be embedded in the glass that fills the grooves made in the substrate. Such a method has drawbacks: the conductive wire embedded in the glass should have an expansion coefficient close to that of glass and ferrite. This rules out the use of copper. The high temperatures (greater than 600° C.) needed for the melting of the glass rule out the use of insulated wires, and this makes it difficult to fabricate wound matrix heads. The mechanical grooving, done with a standard mill, produces rectangular-sectioned grooves whereas the search for improved efficiency of the magnetic heads would lead to the narrowing of these grooves at the poles. And the presence of wires going out of the substrate is very much of an inconvenience during the formation of the poles by the thin-layer technique.

There are methods, known from the French patent applications Nos. 87 14 820 and 87 148 24, for making magnetic heads According to these methods, V-shaped grooves are made in the ferrite substrate, and they are partially filled with glass. This removes a part of the above-mentioned drawbacks through the narrowing of the grooves in the vicinity of the poles and through the fact that a free space is left in the grooves, making it possible to do the winding at a final stage. However, it is difficult to implement these methods because the first polishing has to be done with very high precision for the width of the grooves, which is a vital parameter of the magnetic heads, greatly depends on it. Furthermore, it is difficult, if not impossible, to check the partial filling of the grooves, especially in the case of multitrack heads.

SUMMARY OF THE INVENTION

An object of the present invention is a method for making multitrack magnetic heads which can be used to obtain narrow grooves at the poles in order to obtain, in particular, high reading efficiency of the heads, and which enables the conductors to be wound at the end of the process, so that it is possible to use enamelled wire.

Another object of the present invention is a multi-track magnetic head having, in its magnetic circuit, at the poles, the smallest possible interval between branches of the magnetic circuit without harming the efficiency of the heads, and enabling the coiling wires to pass through with ease.

The method according to the invention, applied to the making of a multitrack magnetic head of the type with a magnetic circuit made of material with low magnetic reluctance and poles made of magnetic material, consists in making a first network and a second network of grooves, made to match each other, on different faces of blocks made of a material with low magnetic permeability, filling the grooves of the first network with a non-magnetic material, forming poles made of material with high magnetic permeability on the first network of filled grooves, and making the winding wires pass through the other network of grooves.

The multitrack magnetic head according to the invention comprises successively: a layer of poles, a layer of pads made of material having high magnetic permeability separated by non-magnetic material, a layer of pads made of material having high magnetic permeability between which the internal part of the winding wires is positioned, a massive layer of material with high magnetic permeability, and the external part of said winding wires.

BRIEF DESCRIPTION OF THE DRAWINGS

The present invention will be understood more clearly from the detailed description of several embodiments, taken as non-restrictive examples and illustrated by the appended drawings, wherein:

FIGS. 1 to 8 are simplified sectional views of substrates illustrating a first manufacturing method according to the invention;

FIGS. 12 to 16 are simplified sectional views of substrates illustrating a second manufacturing method according to the invention; and FIGS. 17 to 20 are simplified sectional views of substrates illustrating a third manufacturing method according to the invention;

DETAILED DESCRIPTION OF THE INVENTION

Figure 9:
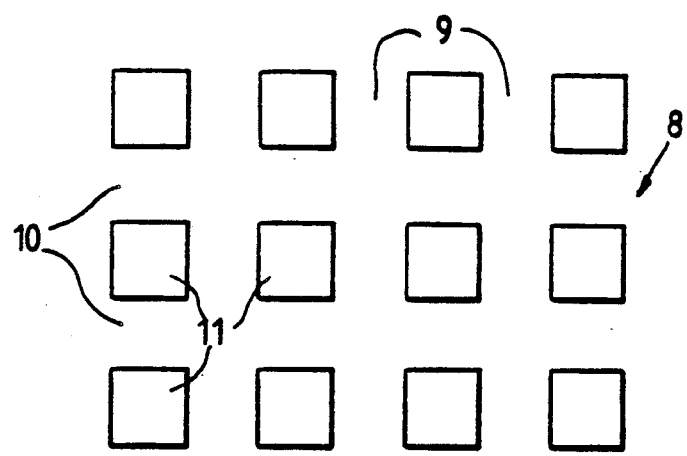
FIGS. 9 to 11 are top views of substrates at different steps of the first manufacturing method, showing the shapes and arrangements of the networks of grooves.

Here below, we shall describe the essential steps of manufacturing, according to three manufacturing methods of the invention, of a multitrack magnetic head, especially a multitrack recording head with matrix addressing. Such a magnetic head may have, for example, a dense network of 256 micro-heads to read a magnetic tape of usual width.

The characteristics common to these three manufacturing methods consist in the making of two distinct networks of grooves made in different faces of the magnetic circuit and matched with each other, and the total filling of one of the networks of grooves with a non-magnetic material, the winding wires being placed in the other network of grooves.

According to the first manufacturing method, the following operations are performed:

the method starts with a square-shaped or slightly trapezoidal substrate 1 block, of relatively substantial thickness (about 2 mm for example). Of course, this individual substrate may form part of a large-sized plate including several substrates that are machined simultaneously and then separated by sawing up the large plate.

On one face of the block 1, a network 2 of grooves is made, demarcating the pads of the magnetic heads formed subsequently (FIG. 1). This network 2 is, for example, like the one shown in unbroken lines in FIG. 10. The network 2 of FIG. 10 has a first series of grooves 3, parallel to one another, and a second series of grooves 4, parallel to one another but not as wide as the grooves 3. The grooves 3 form an angle A with the grooves 4. In a preferred embodiment, this angle A is about 45° to 90°. Thus, a network of elongated parallelogram-shaped parallel pads 5 is determined on the substrate 1.

In one embodiment, the width of the grooves 3 is about 100 μm and the distance between two consecutive grooves 3 is about 50 μm; and the width of the grooves 4 is about 50 μm and the distance between two consecutive grooves 4 is about 100 μm. The depth of the grooves 3 and 4 is, for example, about 200 μm for a substrate 1 with a thickness of about 2 mm. However, it is quite clear that the network 2 may have other geometrical shapes suited to the shapes of the poles that it is sought to obtain.

then, the network of grooves 2 is filled with a non-magnetic material 6 such as glass (FIG. 2). To be sure that the grooves are all filled, the material 6 is made to overflow slightly.

then the upper face of the of the substrate 1 is planed down by removing the excess of material 6 and thus baring the pads 5 (FIG. 6).

Moreover, a network 8 of grooves (FIG. 4) is made in another block of substrate 7, made of the same material as the block 1. The block 7 preferably has the same dimensions and shape as the block 1. The block 7 can also be cut out of a big plate having several identical blocks machined at the same time.

The network 8 of grooves has a first series of grooves 9 parallel to one another and a second series of grooves 10, also parallel to one another. Preferably, the grooves 10 are substantially orthogonal to the grooves 9 and have the same dimensions as them. Preferably also, the width of the grooves 9 and 10 is substantially equal to the distance between two successive grooves of the same series, and this determines square-shaped pads 11 on the block 7. According to one embodiment, the width of the grooves 9 and 10 is about 75 μm, and their depth is about 75 μm for a block with a thickness of about 2 mm.

Figure 10:
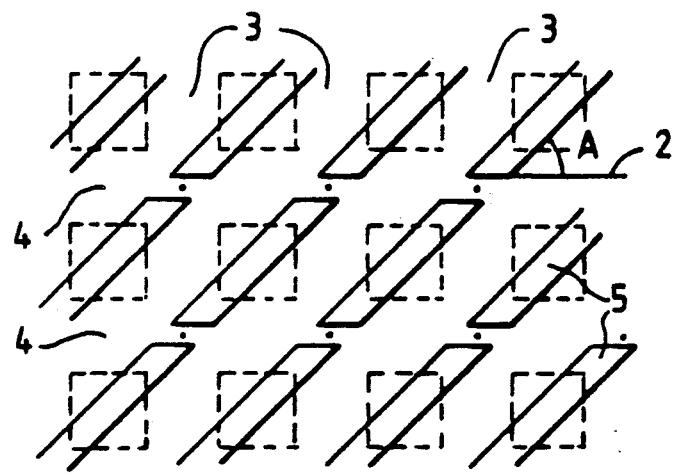

The networks 2 and 8 are matched with each other, that is, they are prepared in such a way that when the pads 1 and 7 are superimposed by making their respective sides coincide, the centers of the pads 5 coincide with the centers of the pads 11 (see FIG. 10 on which the pads 11 are drawn with broken lines).

Then, a block 1 and a block 7 are assembled by bonding so that their grooved faces are facing each other and so that their respective sides are coplanar (FIG. 5). This is made possible through the fact that a non-negligible part of the surface of the pads 5 coincides with the also non-negligible part of the surface of the pads 11 (see FIG. 10).

The next step consists in getting rid of the base 12 of the pads 5 by trueing and polishing, in leaving only these pads 5 and the material 6 that separates them (FIG. 6).

Figure 11:
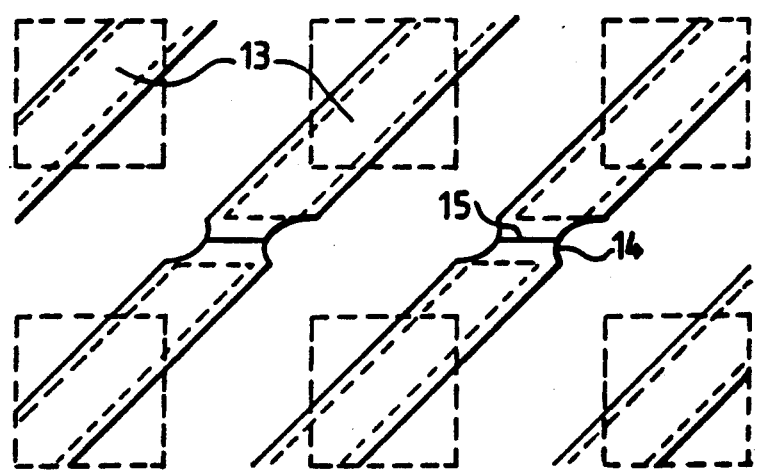

A network of poles 13 is then formed (FIG. 7) on the polished surface of the pads 5 and of the material 6. In the example shown in FIG. 11, the poles 13 approximately have the shape of elongated parallelograms, substantially coinciding with the pads 5. Unlike the pads 5 which, in each line of pads, are separated by relatively wide grooves 4, the adjacent poles 13 of one and the same line of poles join up by means of a constriction 14 cut in its middle by a very narrow gap 15 (of the order of 1 micron or less). This gap may be parallel to the direction of the grooves 4, or it may form an angle of up to 45° with this direction.

The poles 13 are advantageously formed by means of a planar technology, as described for example in the French patent application No. 88 05592. These poles are made of a material with low reluctance such as Sendust or Permalloy for example. Their width, outside the constriction zone 14, is substantially equal to that of the pads 11.

In the last step, the wires of the lines L and columns C of the matrix head thus made are put through the network of grooves. These wires may be made of enamelled copper since this winding step is the last step of manufacturing of the head.

According to the second manufacturing method, illustrated by FIGS. 12 to 16, the block with glass-filled grooves is thinned down before it is bonded to the other block, and the wires are wound on this other block, also before bonding. In detail, the following are the different steps of this second manufacturing method.

grooving of the first block 16 (with the same network of grooves as the network 2), filling of the grooves 17 with glass 18, planing down of the excess glass, polishing (FIG. 12);

deposition of the poles 19 in the same way as for the poles 13 (FIG. 13);

removal of the base 20 of the pad 16 by trueing and, if necessary, polishing to let the glass 18 (FIG. 14) appear;

grooving of the second block 21 (with the same network of grooves as the network 8) and winding of the wires of the lines L and columns C (FIG. 15);

bonding of the two blocks, the grooved face of the block 21 being applied against the face of the block 16 that does not have the poles 19 (FIG. 16).

According to the third manufacturing method, illustrated by FIGS. 17 to 20, the two networks of grooves are made in the same block, on both sides of this block, and they are therefore matched with each other without its being necessary to carry out any bonding of blocks. The second block does not have to be grooved and acts as a lid to the face of the first block in which the grooves for the wires are made. However, according to one variant (not shown), shallower grooves are made in the face 22A, and grooves symmetrical to those of the second network are made in the lid.

In detail, the following are the different steps of this third manufacturing method:

grooving of a first face of the first block 22 (with the same network of grooves as the network 2), filling of the grooves 23 with glass 24, planing down of the excess glass, polishing (FIG. 17);

deposition of the poles in the same way as for the poles 13 (FIG. 13);

grooving of the second face 22A of the first block 22 with a network of grooves 26 identical to the groove 8

(FIG. 19). The bottom of the grooves 26 should at least meet the bottom of the grooves 23 (as shown in FIG. 19).

bonding on the face 22A of a lid 27, made of ferrite, having the same shape and area as the original block 22, with a thickness of about 1 mm.

winding of the wires of the lines L and columns C.

According to one variant of the method of the invention, the wires of lines and columns can be deposited, for example by electrolysis.

Thus, through the method of the invention, it is always massive parts that are handled, and these parts have not been made brittle by double grooving or excessing thinning (in the third manufacturing method, at the step shown in FIG. 19, the first grooves 23 are filled with glass, on a thickness sufficient for the rigidity of the unit), and the wires are wound at the end of the process, thus making it easy to carry out the prior steps.

What is claimed is:

1. A method for manufacturing a multitrack magnetic head wherein said magnetic head has a magnetic circuit made of low magnetic reluctance material and magnetic poles, said method comprising the steps of:
   providing a first network of grooves on one face of a first block of low magnetic permeability material;
   making a second network of grooves on one face of a second block of low magnetic permeability material, said second network of grooves made to correspond with said first network of grooves;
   filling the grooves of said first network with a non-magnetic material;
   bonding together said first and second block so that said one face of said first block is adjoining said one face of said second block;
   forming poles made of high magnetic permeability material on said first network of filled grooves;
   providing winding wires and passing said winding wires through said second network of grooves.

2. A method according to claim 1, wherein the first network of grooves comprises two series of grooves, the grooves being parallel to one another in each of the series, the grooves of one of the series being wider than the grooves of the other series.

3. A method according to claim 2, wherein the grooves of one of the series makes an angle (A) of about 45° to 90° with the grooves of the other series.

4. A method according to claim 1, wherein the second network of grooves comprises two series of grooves, the grooves being parallel to one another in each of the series, each of the series of grooves having the same width, the grooves of one of the series being orthogonal to the grooves of the other series.

5. A method according to claim 1, wherein the two networks of grooves are made on different blocks of the same area made of material with high magnetic permeability.

6. A method according to claim 1, wherein the two networks of grooves are made on one and the same block made of material with high magnetic permeability.

7. A method according to claim 1, wherein the poles are formed on the planed down and polished face of the first network.

8. A method according to claim 5, wherein the first block in which the first network of grooves is made is filled with a non-magnetic material and then planed down, the second network of grooves is made in the second block, the two blocks are assembled by bonding, their grooved faces being positioned so as to be facing each other, then the base of the first block is eliminated by trueing and polishing, and the poles are formed on the polished face of the first block.

9. A method according to claim 5, wherein the block in which the first network of grooves is made is filled with non-magnetic material and then planed down, magnetic poles are formed on the face that is thus planed down, the other face of the block is machined until the non-magnetic material is made to appear, the second network of grooves is made in the second block, the winding wires being positioned in the grooves of this second block, and the two blocks are joined together by bonding.

10. A method according to claim 6, wherein the second network of grooves is made after the filling of the first network of grooves with a non-magnetic material.

11. A method according to claim 10, wherein the second network of grooves is closed by a lid made of material with low magnetic permeability.

12. A method according to claim 1, wherein the material with high magnetic permeability is ferrite.

13. A method according to claim 1, wherein the non-magnetic material is glass.

14. A method according to claim 1, wherein the material with high permeability is Sendust or Permalloy.

15. A method according to claim 2 wherein, in the first network of grooves, the grooves of one of the series have a width of about 100 $\mu$m and the grooves of the other series have a width of about 50 $\mu$m.

16. A method according to claim 4 wherein, in the second network of grooves, the grooves have a width of about 75 $\mu$m.

* * * * *

UNITED STATES PATENT AND TRADEMARK OFFICE
CERTIFICATE OF CORRECTION

PATENT NO. : 5,093,980
DATED : MARCH 10, 1992
INVENTOR(S) : Francois MAURICE ET AL It is certified that error appears in the above-indentified patent and that said Letters Patent is hereby corrected as shown below:

```
Column 5, line 26, delete "low" and insert --high--.
Column 5, line 28, delete "low" and insert --high--.
Column 6, line 38, delete "low" and insert --high--.
```

Signed and Sealed this

Seventh Day of May, 1996

Attest:

BRUCE LEHMAN

*Attesting Officer*  Commissioner of Patents and Trademarks